(12) United States Patent
Predovic

(10) Patent No.: US 6,907,422 B1
(45) Date of Patent: Jun. 14, 2005

(54) METHOD AND SYSTEM FOR ACCESS AND DISPLAY OF DATA FROM LARGE DATA SETS

(75) Inventor: Daniel Thomas Predovic, Toronto (CA)

(73) Assignee: Siebel Systems, Inc., San Mateo, CA (US)

(*) Notice: Subject to any disclaimer, the term of this patent is extended or adjusted under 35 U.S.C. 154(b) by 589 days.

(21) Appl. No.: 10/025,061

(22) Filed: Dec. 18, 2001

(51) Int. Cl.[7] .............................................. G06F 17/30
(52) U.S. Cl. ....................... 707/2; 707/1; 707/4; 707/7
(58) Field of Search .............................. 707/1, 2, 4, 7; 709/203

(56) References Cited

U.S. PATENT DOCUMENTS

| | | | |
|---|---|---|---|
| 6,014,656 A | * | 1/2000 | Hallmark et al. ............... 707/2 |
| 6,289,334 B1 | * | 9/2001 | Reiner et al. .................... 707/3 |
| 6,571,282 B1 | * | 5/2003 | Bowman-Amuah ......... 709/219 |
| 6,691,109 B2 | * | 2/2004 | Bjornson et al. ............... 707/4 |

* cited by examiner

*Primary Examiner*—Frantz Coby
*Assistant Examiner*—Haythim Alaubaidi
(74) *Attorney, Agent, or Firm*—Blakely, Sokoloff, Taylor & Zafman LLP; James W. Soong

(57) ABSTRACT

A method and system for accessing and display of data records from large data sets. The method includes defining a plurality of boundaries to logically partition the large data set into a plurality of buckets in accordance with a predefined sort order. The sort order is based on data stored in at least two columns of a database table in which at least a base portion of each data record is stored. In response to a request to retrieve a data record or group of related records, such as all contacts having a given first and last name, a determination is made to which bucket the data record or at least a portion of group of related records are stored in. A query is then formulated to retrieve a subset of the large set of records from the database corresponding to data records contained in the bucket.

23 Claims, 7 Drawing Sheets

METHOD AND SYSTEM FOR ACCESS AND DISPLAY OF DATA FROM LARGE DATA SETS

BACKGROUND OF THE INVENTION

1. Field of the Invention

The present invention concerns databases in general, and, in particular, a method for access and display of data from large data sets in which the large data sets are portioned into a plurality of buckets, each of which contain a small subset of records in the large data set.

2. Background Information

During the past decade, the use of databases that store very large amounts of data has become increasingly prevalent. This is due, in part, to the availability of both computer hardware and database software resources to support these large databases. Prior to the present widespread availability of these resources, data was typically stored using "flat-file" databases or data systems running on mainframes or standalone computers using storage schemes that either supported limited sizes, or provided limited real-time access to the data (e.g., data systems that stored data on tapes). Oftentimes, an enterprise organization had various types of data stored on separate machines that did not provide for easy remote access. In contrast, today's IT environments often involve the use of huge centralized repositories in which data for an entire enterprise are stored, wherein the repositories may be accessed from remote clients connected to them via LANs, WANs, or even over the Internet.

The majority of the large databases in operation today are RDBMS (relational database management system) databases. Furthermore, most of these RDBMS databases are SQL-(structured query language) based databases. These SQL databases run on database software provided by various vendors, including Oracle (Oracle 8i and 9i), Microsoft (SQL Server 7), IBM (DB2), Sybase, and Informix. RDBMS databases are usually run on one or more networked database servers and are accessed by client machines connected to the database server(s) via a computer network. On some n-tier architectures, there are one or more middle tiers (e.g., application servers) that sit between a "backend" database server and the clients. A typical 2-tier architecture is illustrated in FIG. 1, wherein a database 10 hosted by a database server 12 may be accessed by a client machine 14 via a network 16. Modern SQL RDBMS databases enable a multitude of client users to concurrently access (i.e., Insert, Update and Delete) data using appropriate client-side software (or through middleware running on an application server), such as client applications that provide a graphical user interface (GUI) that allows users to interactively access database data.

In RDBMS databases, data are stored in tables in accordance with a database "schema," which defines storage parameters (metadata) that define structures for each of the tables stored in the database, various data constraints, relationships between tables, and indexes, etc. Generally, the table data are stored in one or more shared storage spaces, each comprising one or more datafiles, although there are some RDBMS databases that store data for each table in a separate file, and others that store all of the data for a given database in a single file. Under Oracle's architecture, these shared storage spaces are called "tablespaces." Typically, an Oracle database will include a plurality tablespaces (e.g., system, user, rollback, etc.), wherein user data are stored in a plurality of tables in one or more selected tablespaces that may be specifically configured using various configuration parameters during creation or alteration of the tablespaces.

Data are stored in a tablespace in the following manner. First, a plurality of segments are allocated for the tablespace and a datafile is assigned to the tablespace, wherein each segment comprises a plurality of fixed-size (e.g., 2K, 4K or 8K) storage blocks. Each of these storage blocks comprise-multiple operating storage blocks, which are the base unit the operating system uses to define where data is physically stored. These storage blocks are (typically) filled with data in a substantially sequential manner until close to all of the storage space provided by the allocated segments is consumed. At this point, the tablespace must be "extended" with one or more extents (similar to segments) so that additional data may be added. Typically, the data is logically stored in a plurality of rows, wherein each row of data includes a set of data (i.e., record) pertaining to various columns defined for the table the data are stored in. In Oracle, additional "row ID" information that uniquely identifies every row in the database is stored for each row. The row ID comprises a string having an encoded format that can be parsed by Oracle to quickly access the row of data corresponding to the row ID. The row IDs are used by primary key and other types of indexes to speed up queries and sorting operations.

As discussed above, the data are stored in a substantially sequential manner based on the approximate order the data are entered into a database. (For example, Oracle uses a background operation to write blocks of data in response to predetermined conditions (memory full, time interval, etc.), wherein the block writes are performed continuously, although they are slightly asynchronous to when data are actually entered.) As a result, the data for a given table are stored in a somewhat randomized order. For instance, suppose that contact information corresponding to various customers are stored in a table that includes various rows for storing the contact information, such as last name, first name, address, city, state, phone number, etc. As new contact information is entered into the database, data pertaining to a new row will be written to the initial datafile (or currently active datafile) corresponding to the tablespace the table is assigned to. Since the contact information will usually not be entered in a sequential manner (e.g., alphabetically be last name), a sequential row-by-row examination of the data in the datafile will appear to not follow any predetermined ordering scheme, as illustrated by a randomized set of all contact records 18 in database 10.

In contrast to the foregoing data storage scheme, database users (both people operating client machines and internal software components that perform batch operations) typically desire to retrieve and/or view data in an ordered (i.e., sorted) manner. To meet this criteria, databases provide various solutions for providing requested data in a sorted configuration based on specified sort criteria, such as last name sorted alphabetically. In general, the data corresponding to a requested data set (i.e., query) must first be retrieved to a temporary sort space (comprising physical storage and/or memory space), whereupon the data are sorted corresponding to the predefined ordering scheme, and then provided to an application, applet, or module that is used to present the data to the user (or provide the data to an internal software component user).

In non-indexed queries (i.e., a query that doesn't use a primary key or other index for a table or set of related tables), a full table scan must be performed to retrieve appropriate rows specified by the query (the result set or recordset), and then a memory or disk sort must be performed on the result set prior to providing the data to the user as an "open" data set. For index-based queries, one or more indexes are used to identify the appropriate rows of data in the result set, whereupon mapping information provided by the index(es) (e.g., row IDs) that identifies where those rows of data are located is used to retrieve appropriate rows of data meeting the query search criteria. In some instances, the rows of data are retrieved in a sorted order. In other cases, this is not possible or impractical, and the rows of data are first retrieved and then sorted in the sort space.

For example, suppose a user wanted to view all of the contacts stored in database 10 sorted by their last names. In the two-tier architecture illustrated in FIG. 1, the user is running a client-side application 20 on client machine 14, which includes business logic 22 that generates a query 24 in response to a user request to view all of the contract records and submits query 24 to database 10 via network 16. Assuming the data are stored in a single CONTACT table that includes a LASTNAME column, the corresponding SQL query would look like:

SELECT*FROM CONTACTS
ORDER BY LASTNAME;

Generally, a request for all records in a table will cause a table scan to be performed, regardless of whether or not indexes are used. The rows in the contact table (stored as randomized set of contact records 18) are retrieved and sent to a sort area 26, which depending on the size of the sort may comprise a memory space and/or a temporary disk storage space. The rows are then sorted, using a sort process 28 and then provided back to client-side application 20 as a sorted full recordset 30.

The retrieval and sorting of data can be very time-consuming, particularly if the sorting has to be performed using a disk sort. This is often the case for large result sets, which may involve millions, or even 10's of millions of rows of data. In such instances, even an optimized query using indexes might take 10's of minutes or even hours. Furthermore, such queries are resource (CPU and memory) intensive, often slowing access by other users to a substantial halt.

In response to this problem, RDBMS database vendors have developed various schemes to provide data to GUI-based applications that function as client-side front ends to enable users to access and view the database data. Typically, these schemes are centered around "virtual" lists of data that are either continually loaded using background operations or implemented through the use of built-in SQL commands, such as the TOP command. These conventional schemes are limited in their ability to retrieve and provide data to end users when large data sets are queried.

In continuance of the foregoing example, in one conventional embodiment, sorted full recordset 30 is logically stored as a virtual list that is managed by a virtual list manager 32. (In instances in which a very large number of rows are to be accessed, virtual list manager 32 may actually manage smaller sets of all of those rows that are continually being retrieved from database 10 using a background process—for convenience, a complete data set is illustrated in FIG. 1.) Virtual list manager 32 interacts with a GUI manager 34 that is used to provide display information to a video subsystem that includes a display device (e.g., monitor) 36 to generate a GUI display screen 38 that enables the user to selectively view contact data stored in database 10. Typically, virtual list manager 32 will implement a filter 40 to pass a small number of rows of data to GUI manager 34, which then displays the rows in GUI display screen 38.

The conventional schemes for retrieving and display data from very large data sets have several problems. Most notably, they are very slow, consume a great deal of resources, and in the case of huge data sets, may not even be possible to perform in a useable manner.

SUMMARY OF THE INVENTION

The present invention provides a method and system for accessing and displaying data records that are retrieved from large data sets in a manner that dramatically reduces the latency problems common to conventional access schemes. In accordance with the method, a large data set is logically partitioned into a plurality of "buckets" by defining "soft" boundaries corresponding to a sort order in which data records are presented to users or provided to internal users for purposes like batch processing. When a request to retrieve a data record or group of related records is received, e.g., in response to a user navigation event, the bucket of data the record or at least a portion of the group of related records is stored in is identified, and those records are retrieved from the database sorted in accordance with the sort order, and provided to the requester.

Data defining a relative position of each boundary point in the sort order are built and stored as a set of boundary markers, preferably during an administative process. Each of these boundary markers comprises a unique set of data corresponding to two or more columns in a database table on which the sort order is based, and in which at least a base portion of the data records are stored. Preferably, the chosen columns will already be indexed or have indexes applied to them subsequent to building the boundaries. In some instances, a pair of columns are used, such as columns that store first and last name data. When very large data sets are used, it may be necessary to use a tertiary set of column data, or even a higher number of columns. The boundary markers are stored in sets, preferably in accordance with the sort order they correspond to.

In response to a request to retrieve a data record or group of related data records, such as a list of contacts from a contact table or object having the same first and last name, the boundary markers are searched to determine which bucket the desired data record or records are contained in. A query is then formulated based on the boundary markers to retrieve the records corresponding to the bucket.

In a typical n-tier implementation of the invention, the software components for implementing the invention are run on an application server that receives various data requests and navigation events from various clients. Upon retrieving an appropriate bucket of data records in response to such requests, all or a viewable subset (viewset) of the records are provided to the clients to enable users to access the data record or group of related data records. In instances in which viewsets are used, new viewsets of data records are provided to the client in response to navigation events, such as scrolling. In response to a navigation event that seeks data records that are not contained in a current bucket, a new bucket in which the requested data records are contained is identified and retrieved, and a new viewset from the new bucket is presented to the user. In this manners, users can search or browse data records retrieved from data sets that may comprise 10's of millions or even 100's of millions of records, wherein new viewsets are typically provided to the user with subsecond responses.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE ILLUSTRATED EMBODIMENTS

A system and method for retrieval and displaying data from large datasets is described in detail herein. In the following description, numerous specific details are discussed to provide a thorough understanding of embodiments of the invention. One skilled in the relevant art will recognize, however, that the invention can be practiced without one or more of the specific details, or with other methods, components, etc. In other instances, well-known structures or operations are not shown or described in detail to avoid obscuring aspects of various embodiments of the invention.

Reference throughout this specification to "One embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The present invention provides a mechanism for accessing very large data sets, wherein the data sets are logically broken into manageable "buckets" of data, greatly reducing the data access latencies inherent in the prior art. The mechanism and its associated operations are referred to herein a large data volume (LDV) handling or simply LDV. LDV works by dividing a query that would normally be used to retrieve a large number of rows of data (e.g., contact data from a contact table or set of related tables) into a number of smaller queries, wherein each query specifies a set of data contained in a data bucket. A bucket is defined as all of the data returned from a corresponding SQL query, set with a pre-defined sort order, in which upper and lower boundaries are used to specify the range of data contained in the bucket.

Figure 2:
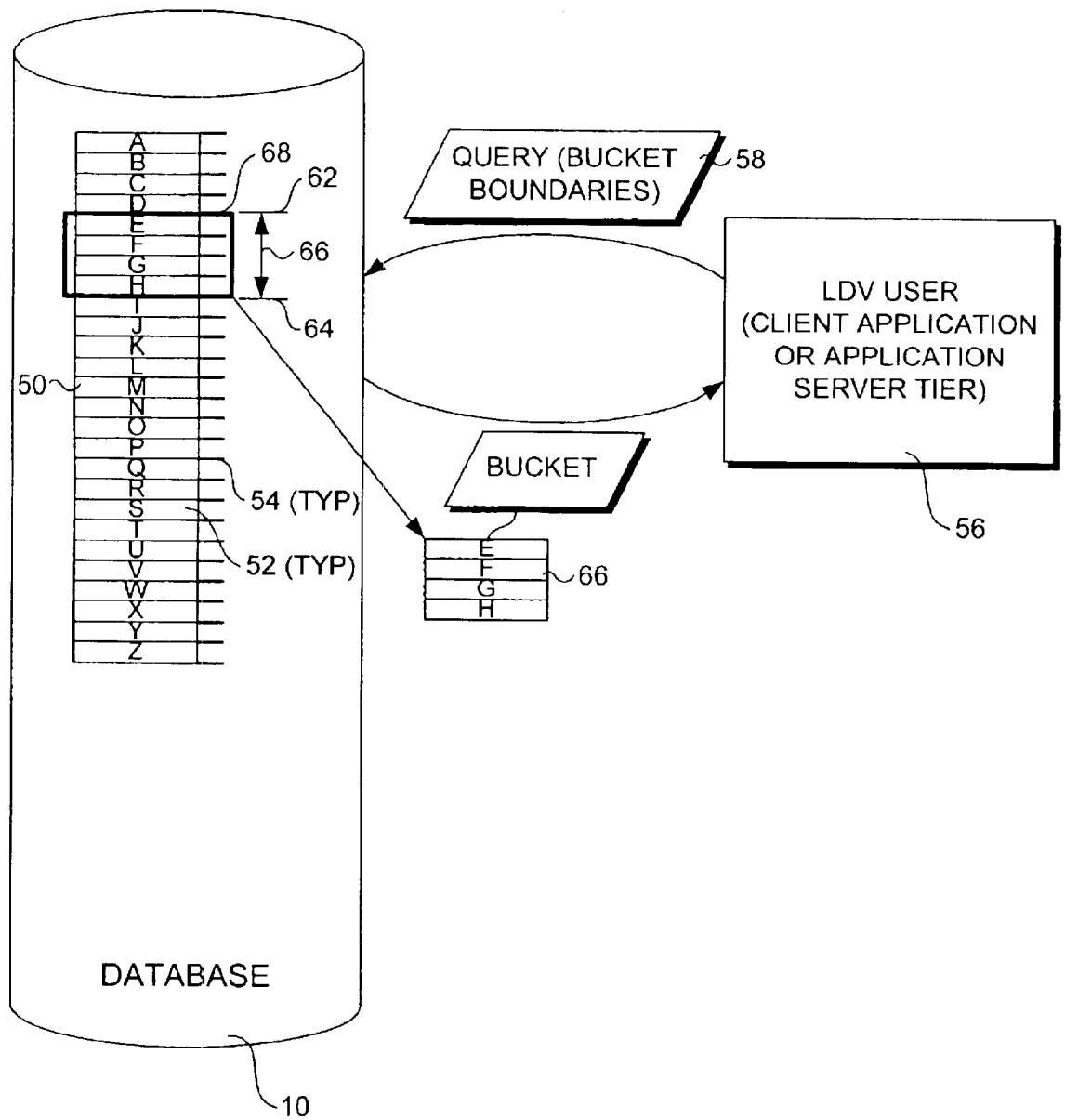
FIG. 2 is a schematic diagram conceptually illustrating how data records from large data sets are retrieved in "buckets" in accordance with the present invention.

Logically, all of the rows of data for a target object (e.g., a table or set of tables containing related data) are sorted corresponding to a specified sort order and then divided into a plurality of contiguous buckets. This configuration is illustrated in FIG. 2, in which a sorted contact table 50 is divided into a plurality of buckets 52 defined by boundaries 54. As used herein, the various data in a "base" table are logically shown as being divided alphabetically into buckets and corresponding bucket boundaries. This is merely illustrative to show the buckets and boundaries are generated corresponding to a sort order, as explained below, LDV provides various schemes for dividing data sets into buckets. Upon a request from an LDV user 56 to retrieve (for batch processing) or view (for end-users) a particular record or group of related records, LDV determines an appropriate bucket that record or group is stored in and retrieves the bucket. An appropriate query 58 is then formulated and submitted to database 10 for execution, returning a data set comprising a bucket 60 that includes data contained within a lower boundary 62 and upper boundary 64 specified by the query. The difference between the lower and upper boundaries define a size of the bucket 66. The bucket is then returned to LDV user 56, whereupon it may be used in a batch process or filtered by a client application that enables users to request and view data stored in database 10. In further response to various events, such as a user requesting to scroll past the end of the records contained in a current bucket or request to seek a record not contained in the current bucket, an appropriate query is formulated to retrieve a new bucket containing the desired records. In this manner, LDV operates like a sliding window 68 over the full set of data records contained in sorted contacts table 50.

Figure 1:
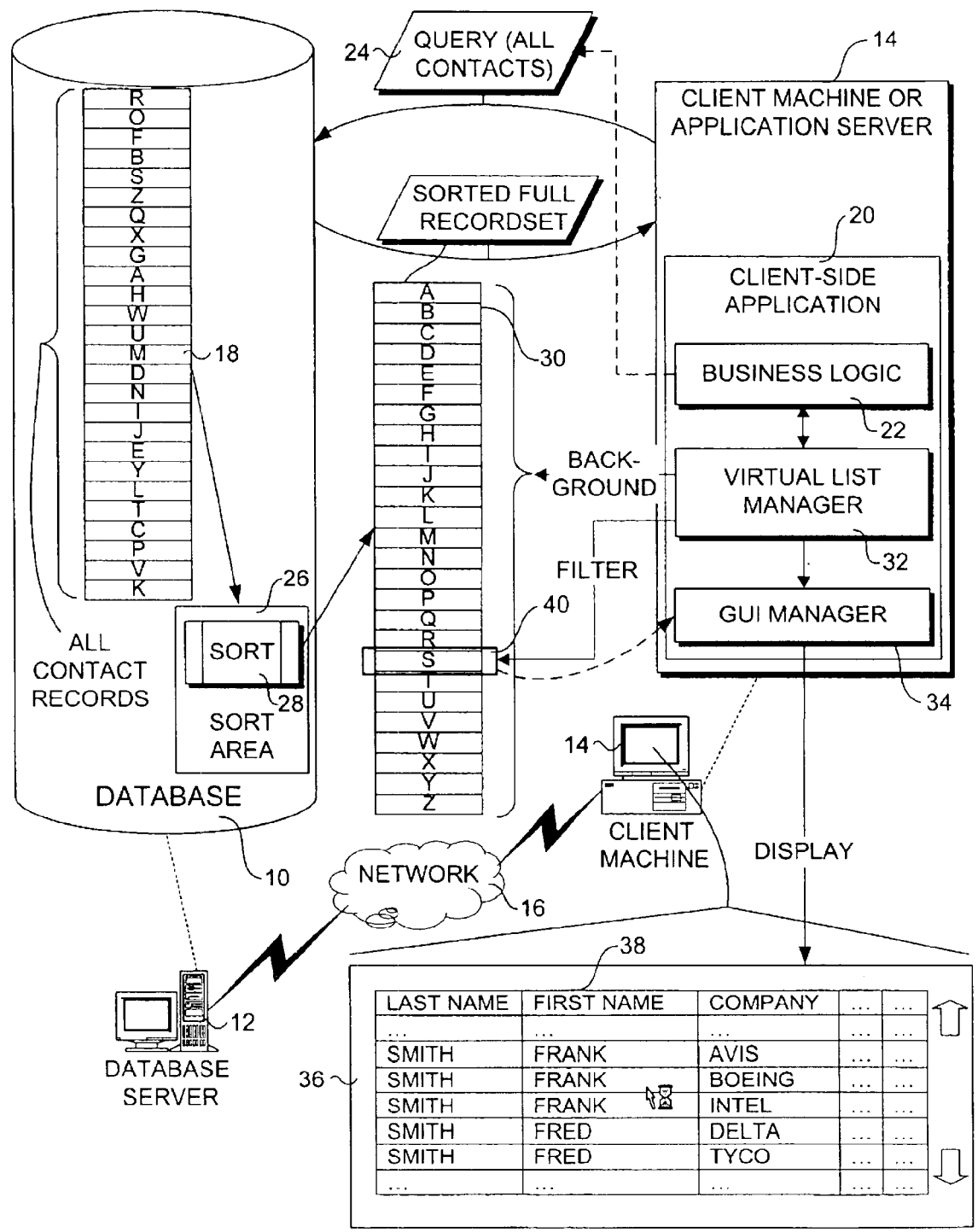
FIG. 1 is a schematic diagram illustrating how data records contained in a full data set are retrieved using conventional data access schemes found in the prior art.

An exemplary architecture 70 illustrating one implementation of the invention is shown in FIG. 2. Architecture 70 includes several components that share the same root reference numerals (e.g., 10 and 10A, etc.) as components depicted in FIG. 1 and discussed above; it will be understood that these components perform substantially similar operations in both architectures. Architecture 70 corresponds to a two-tier environment in which a client application 72 running on a client machine 14 enables a user to selectively view contact data stored in a datafile corresponding to a CONTACT table in database 10 as a randomized set of contact records 18A. It will be understood that in addition to the use of a single table for storing contact information, such information may be stored in a set of related tables, as will be recognized by those skilled in the database arts.

As discussed above, LDV works by retrieving buckets of data rather than an entire data set. The data contained in the buckets are logically bounded by boundaries, the generation of which are described below. In one embodiment, various boundary markers are stored in database 10A, such as depicted by a set of contact boundary markers 74. Optionally, all or a portion of the boundary markers may be stored in one or more files on database server 12A, or in one or more files on client machine 14A.

In one embodiment, various LDV operations are implemented by an LDV class 76 and an LDV helper class 78 provided by client application 72. As will be understood by those skilled in the art, client application 72 may comprise a single software module, or a set of modules that interact using appropriate application program interfaces (API's) 80. In response to user input 82, a business logic component 84 determines what data records a user of client machine 14 desires to view. Business logic component 84 then provides this information to LDV class 76, which generates a first query 86 to retrieve an appropriate set of boundary marker data 88 corresponding to the object containing the data the user requested (in this instance the CONTACT table).

Figure 3:
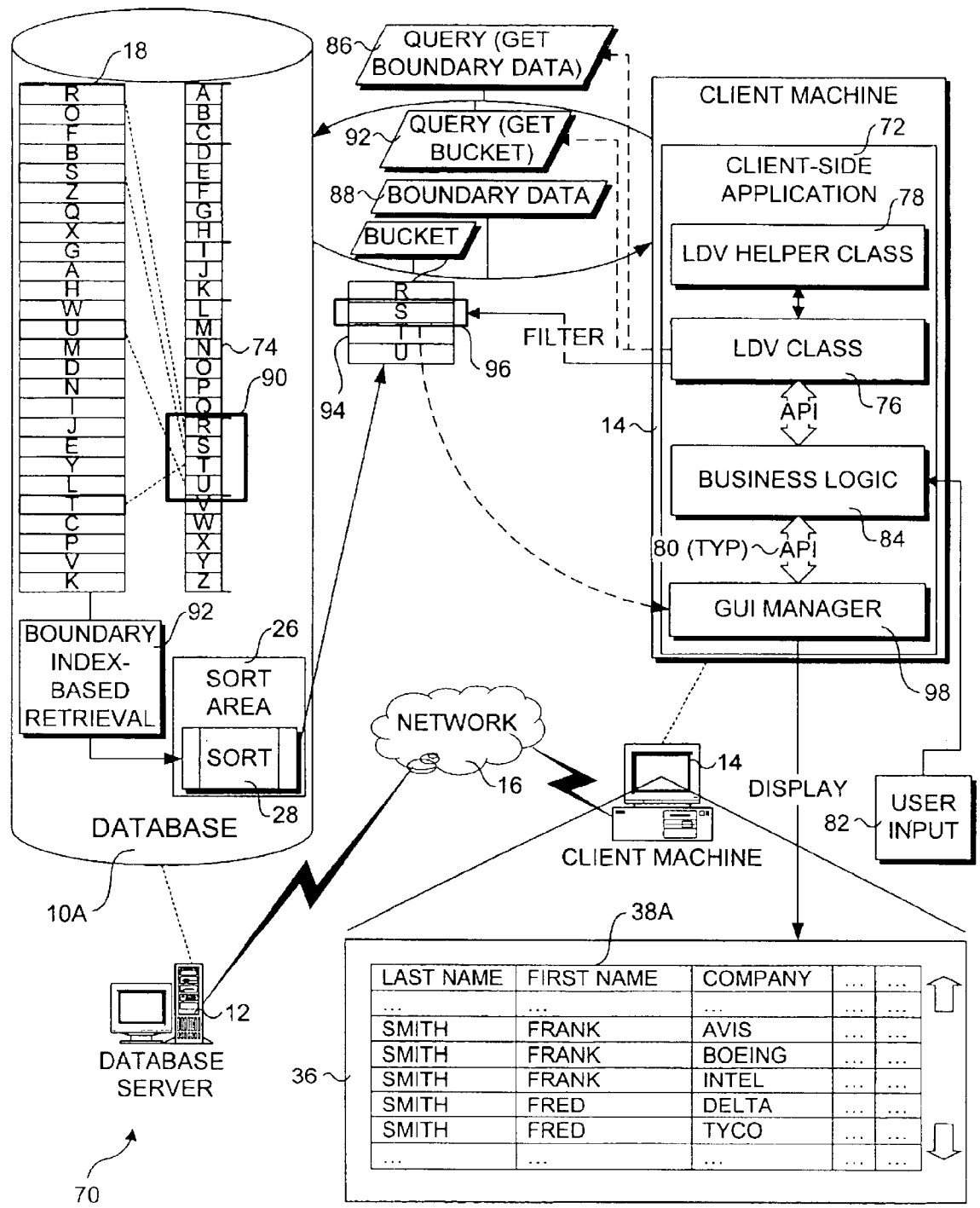
FIG. 3 is an exemplary architecture and data flow diagram corresponding to a two-tier implementation of the invention.

Upon receiving the boundary marker data, LDV class 76 parses the data to determine an appropriate pair of lower and upper boundaries corresponding to the bucket of data the requested data is contained in. For example, suppose that a user desires to search for the contacts with the last name of "Smith." Further suppose that a set of boundary data has been generated for the contact table that uses the LASTNAME column, and includes respective boundaries corresponding to the last record for selected letters C, H, K Q, U, and Z, as illustrated in FIG. 3. Accordingly, the boundary data are parsed to determine the nearest boundaries encompassing the row(s) of data containing a last name of "Smith," which in this case yield the boundaries at Q (lower boundary) and U (upper boundary) corresponding to a bucket 90. As a result, the following SQL query is formulated as a query 92 and submitted to database 10 to retrieve the bucket:

SELECT*FROM CONTACTS
WHERE LASTNAME>Q AND LASTNAME<=U
ORDER BY LASTNAME;

Generally, the columns used for generating boundaries will have a corresponding database index. As a result, in response to the query, database 10 uses a boundary index-based retrieval process 92 that retrieves all of the records for the CONTACTS table contained within the upper and lower boundaries for bucket 90, as depicted by all records having a LASTNAME beginning with the letters R, S, T, and U. The retrieved data are forwarded to sort area 26, whereupon they are sorted by sort process 28 and returned to client machine 14 as an open set comprising sorted bucket data 94. LDV class 76 (or another client-side module) then implements a display filter 96 that is used to determine a current subset of the sorted data in the bucket to be displayed (the "viewset") and passes the viewset to a GUI manager 96, which drives the video subsystem to display data pertaining to the records in the viewset within a GUI display screen 38A on display device 36.

Figure 4:
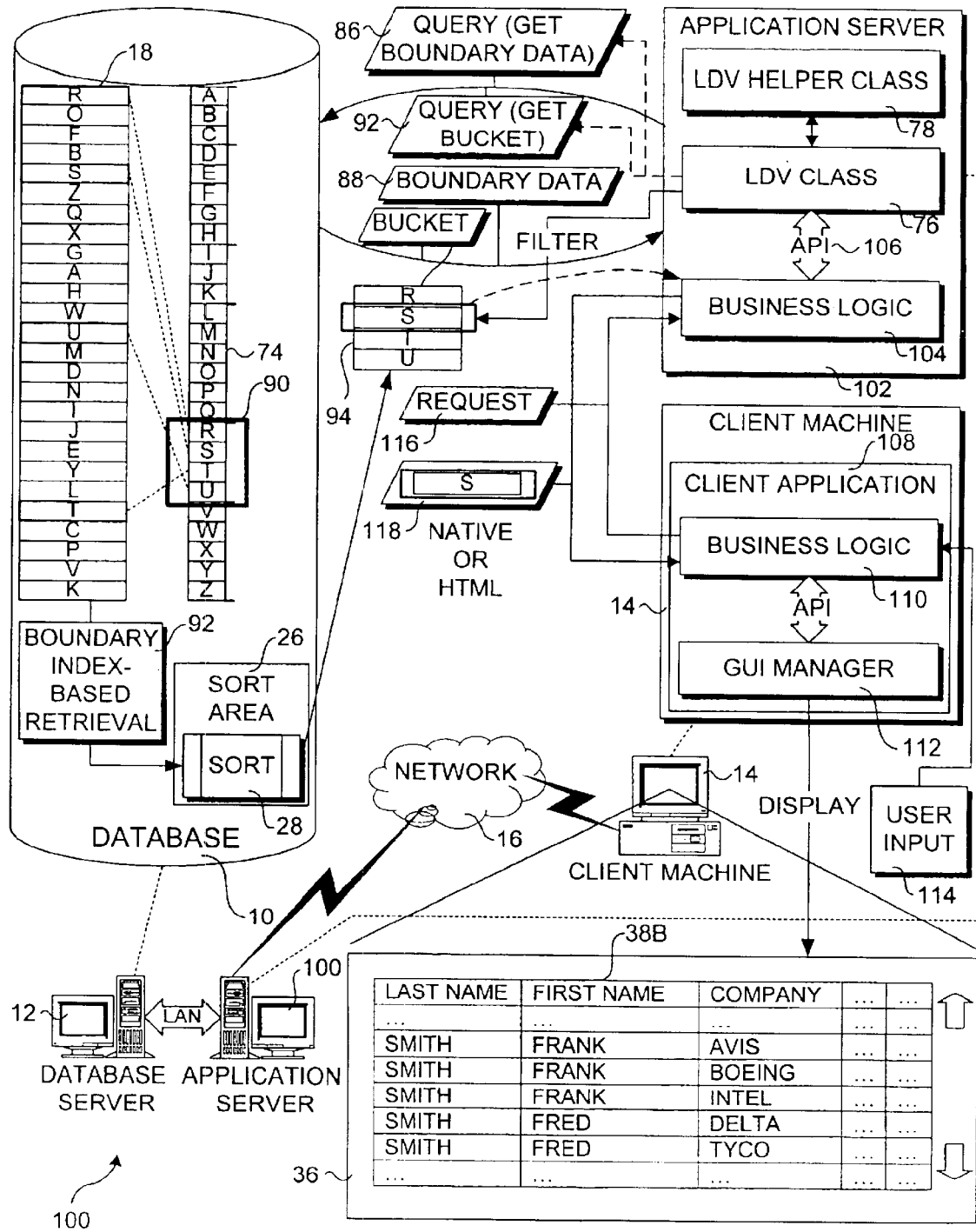
FIG. 4 is an exemplary architecture and data flow diagram corresponding to a three-tier implementation of the invention.

Another exemplary architecture 100 for implementing the invention in an n-tier environment is shown in FIG. 4. As depicted, architecture 100 depicts a well-known 3-tier architecture in which an application server 102 "sits between" database server 12 and a plurality of client machines 14. As well be recognized by those skilled in the art, one or more additionally tiers (e.g., a web server tier) can be added to the illustrated 3-tier architecture.

Application server 102 hosts various software modules that are used to perform various operations, including delivering data to client machines 14 in response to corresponding requests for data from users of the machines. These components include an LDV class 76, and LDV helper class 78, which interact with a business logic component 104 via an API 106. In one embodiment, client machines 14 host a client application 108 that includes a business logic component 110 and a GUI manager 112.

In general, the various aspects of the LDV technology are performed in a substantially similar manner in both of architectures 70 and 100. However, the interaction between the various other software components differ, as follows. A typical request process begins with user input 114 that is received by business logic 110. The business logic processes the user input to determine what data the user desires and submits a corresponding data request 116 to application server 102. In one embodiment, business logic components 110 and 104 comprises a client-server set, that are configured to interact with one another using a common protocol. Accordingly, data requests comprising "native" data pertaining to the common protocol are sent from business logic component 110 to business logic component 104. In another embodiment, client application 108 comprises a web browser, and data request 116 comprises HTML (hyper-text markup language) data.

Typically, data request 116 will be received by business logic 104. Optionally, data request 116 will be received by LDV class 76. The LDV class and LDV helper class than interact with database 10 in a similar manner to that described above, returning a sorted data bucket 94 to the application server. The LDV class and/or business logic 104 then determine what data to filter, ultimately sending the data from business logic component 104 to client machine 14 as filtered display data 118. As before, the filtered display data may be in a native format, or comprise HTML data. Filtered display data is then passed by business logic 110 to GUI manager 112, which drives the client machine's video subsystem to generate a GUI display screen 36B on display device 36.

Building Buckets

As discussed above, LDV retrieves selected buckets of data based on data requests from users rather than entire data sets. The data contained in a given bucket is defined by the boundaries for the bucket. Generally, the boundaries are pre-determined through an administrative process that is somewhat similar to building indexes on a database. Alternately, the boundaries may be generated at runtime.

Figure 5:
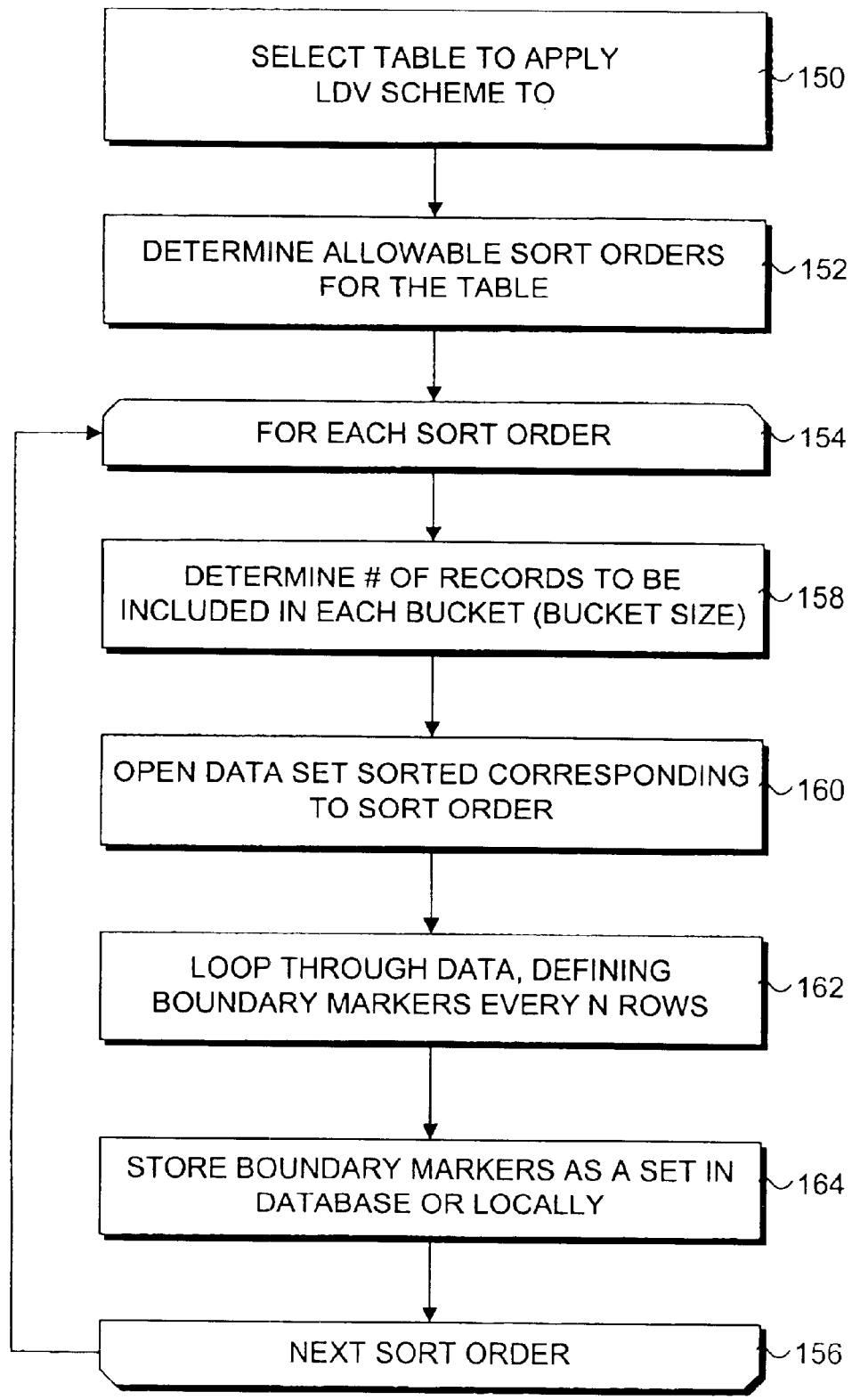
FIG. 5 is a flowchart illustrating the logic used by the invention when generating bucket boundaries.

LDV boundaries are generated in the following manner. Initially, parameters for the process must be selected. With reference to FIG. 5, this process begins in a block 150 in which a table is selected to apply LDV boundaries to. Typically, these tables will store data that is usually presented to end users in a sorted list format, such as contacts, products, employees, clients, etc. In many instances, the tables will comprise "base" or "parent" tables, while the displayed data will include not only data contained in the base or parent table, but also data stored in one or more child tables that are linked to the base or parent table via a primary key-foreign key relationship. For the purposes of LDV, only the base or parent table needs to be considered when generating LDV boundaries.

Next, in a block 152, allowable sort orders for the table are determined. Generally, the sort orders will be based on the intended use of the data, and in one embodiment will be enforced though the LDV data access classes and subsequently by the graphical user interface. Each sort order to be provided requires its own unique set of boundary markers. For example, suppose the targeted table is a contact table that includes contact data stored in various columns, including LASTNAME, FIRSTNAME, COMPANY, ADDRESS, CITY, STATE, etc. Typically, it will be desired to sort the contact data alphabetically by LASTNAME. In addition, other sort orders may be included, such as alphabetical sorted on COMPANY, CITY, STATE etc. Furthermore, the sort order may be complex, comprising a combination of columns. For example, in one instance the data might be sorted on LASTNAME, then FIRSTNAME, then COMPANY. In another instance, the data may be sorted by COMPANY, then LASTNAME, then FIRSTNAME. The actual combination used will depend on the type of data, the column configurations that data are stored in, and how the data are to be presented to the user (or to be used internally by, e.g., a batch processing component). Finally, the selected column or columns should be columns that are either currently indexed, or will have a database index generated for them prior to using the LDV scheme.

The following operations are then performed for each sort order, as indicated by start and end loop blocks 154 and 156. First, in a block 158 the approximate number of records to be included within each bucket is determined. To determine this value, many considerations are required. First, how will the data generally be requested and used? In a two-tier environment for heavy batch processing, a larger bucket size is acceptable, since the entire data set will often need to be processed and the speed of a two-tier connection is provided. In an n-tier environment for GUI restricted usage, like that used in customer relationship management (CRM) data systems, a small bucket size would be better since only a small amount of the data (e.g., 20–30 rows) is viewed at once. Furthermore, since there are many users who are concurrently access the database in typical data systems of this type, larger bucket sizes should be avoided because of their higher server overhead.

Another consideration is "viewability" of data. As a general rule, the size of the bucket should be scaled inversely with the percentage of the database that the user sees. For example, if users always use selection criteria that restrict their view to half of the records in the database, then the bucket size should be doubled. This is because, if a user has a selection criteria set that eliminates half of the database from their view, then each bucket will contain only one-half of its capacity of records that match the baseline selection criteria (when compared with a baseline condition in which the boundaries are defined as if all records will be access). As a result, the actual number of records returned in the bucket remain substantially constant Initialized through an administrative operation, the parameters are used by a process that opens the data set sorted in the appropriate order, as provided by a block 160. In practice, data corresponding to only those columns considered in the sort order need be retrieved, rather than the entire records. For example, if the sort order is based on LASTNAME, then FIRSTNAME, the corresponding SQL query might look like:

SELECT LASTNAME, FIRSTNAME FROM CONTACTS

ORDER BY LASTNAME, FIRSTNAME;

The process then loops through the open data set in a block 162, start to finish, defining boundary markers based on data found every N rows, wherein N corresponds to the number of records for the bucket determined in block 158. Depending on the data size and uniqueness of the data in the chose column, a single column may not be unique enough to mark a boundary. In these cases, the scheme enhances the boundary definition through a second and/or tertiary column, incorporating that data into the boundary marker. For example, suppose the LASTNAME, FIRSTNAME, and COMPANY columns are considered for use as boundary markers. In a small data set of approximately 5,000 rows, each contact's last name may be unique (or have limited duplications), so only data corresponding to the LASTNAME column need to be used for the boundary markers. With large data volumes, it may be common for various data values in the LASTNAME column to be repeated more than N times, such that that two or more sequential boundary markers would be identical if only the LASTNAME column was considered. In this instance, the boundary markers should include data from a second column, such as LAST NAME. In extremely large databases, these two columns may also not be sufficient, so data in a tertiary column (e.g., COMPANY) will be necessary. Similarly, this can be taken to a fourth or higher order if necessary to ensure appropriate uniqueness for each boundary marker. Optionally, a unique data column could be used, such as a client ID column or the like.

When complete, the boundary marker data are stored as a set so that it can be easily accessed during production data retrieval situations. For example, these data may be stored in a database table on database 10, on application server 102, or locally on the client machines. In one embodiment, the boundary marker data is stored as a concatenated string within an optimized database table. In accordance with a tertiary marker comprising LASTNAME, FIRSTNAME, and COMPANY data, boundary markers are stored in a concatenated string having the following format:

|Smith~~Frank~~Boeing|Smith~~Gerald~~Tyco|Smith~~Harold~~IBM|   (1)

In this format, each adjacent set of boundary marker data (e.g., "|Smith~~Frank ~~Boeing|") corresponds to an adjacent boundary point.

In another embodiment, each set of boundary marker data may be stored as a separate record in a table. Whether an implementation uses the concatenated string format or separate records (or still other configurations that will be recognized by those skilled in the data system arts) will likely be dependent on the relative workload of the database and application servers. If the database server workload is light to moderate, built-in database operations (e.g., SQL and cursor loops) can be used to search for appropriate boundary markers. The advantage of the concatenated string technique is that the entire string can be passed to the application server (which requires very minimal overhead for the database server), and then parsed at the application server rather than having an equivalent operation performed by the database server.

As discussed above, building bucket boundaries for a given data set requires the data set to be opened. Conveniently, opening the data set can be performed using the LDV scheme itself so that the entire data set does not need to be opened (at one time) to complete the administrative process. As a result, building bucket boundaries can be carried on during 7×24 operation of the database, without adversely affecting enterprise applications that access the database. In the event that the very first run of the boundary building process is performed, appropriate seed data (i.e., estimated boundaries that should satisfactorily break up the data) can easily be implemented to define a temporary set of boundaries that may be used to retrieve records from the data set using temporary buckets, whereby the actual boundaries and corresponding markers are determined by looping through each temporary bucket of records.

Using Boundaries to Generate SQL for Data Buckets

Each bucket of data that is retrieved from the database includes all of the records contained within the lower and upper boundaries corresponding to the data bucket. Also, any given record in the entire data set will be contained in only one bucket. Accordingly, when using the boundary marker string discussed above, determination of the boundary markers corresponding to the bucket in which a particular data record is stored is performed by parsing the string until passing the first boundary marker that would be logically ordered prior to the particular data record. For example, if the search was for a "Gilbert Smith," concatenated string (1) would be parsed until the "|Smith~~Gerald~~Tyco|" portion of the string was encountered. This represents the lower boundary marker. The next set of boundary marker data corresponds to upper boundary marker. These are used to formulate the SQL statement for the bucket.

In a simple boundary definition that only uses a single column, the SQL will include data in the where clause corresponding to that column. For example, suppose a user is searching on the last name of "Billingsby" in a CONTACT table and the upper and lower boundaries respectively comprise "Benton" and "Bingham."The corresponding SQL statement would then be:

```
SELECT*FROM CONTACTS
    WHERE LASTNAME>'Benton' AND LASTNAME<=
'Bingham'
    ORDER BY LASTNAME;
```

A simple boundary definition, as described above, works well for thousands of rows, but can breakdown when there are many entries with the same value in an extremely large database. An example is a list of names that contains 200,000 Smith's. A more complex algorithm is required for that case. In this instance, the boundary markers will be based on multiple database columns to further break the data into appropriate buckets. In the name example, by using a secondary boundary based on the FIRSTNAME column and a tertiary boundary on the COMPANY column, hundreds of millions of records can be handled since there is a very limited chance of data grouping (i.e., relatively large groups of records having identical values for LASTNAME, FIRSTNAME, and COMPANY). Using the bucket boundary data, the resulting query can be simple to very complex depending on boundaries. A simple bucket would be created when there are many Fred Smiths in the list:

```
SELECT*FROM CONTACTS
    WHERE LASTNAME='Smith' AND FIRSTNAME=
'Fred' AND
    COMPANY>='Avis' AND COMPANY<'Tyco'
    ORDER BY COMPANY;
```

A more complex query results when a bucket spans the first name:

```
SELECT*FROM CONTACTS
    WHERE LASTNAME='Smith' AND FIRSTNAME=
'Fred' AND
    COMPANY>='Xerox' OR
    LASTNAME='SMITH' AND FIRSTNAME>'Fred'
AND
    FIRSTNAME<'Funkie'
    ORDER BY FIRSTNAME, COMPANY;
```

An even more complex query can result when the bucket spans a last name as well.

Although the SQL can appear to be quite complex, resulting query plans show very quick isolation of data due to the user of indexed columns according to the specified sort order defined by the corresponding boundary marker set.

Scrolling Through Data Buckets

When implemented, the LDV scheme enables users to navigate through various data screens or "views" during which appropriate buckets are retrieved and data contained in those buckets are displayed in a manner that is transparent to the users. A flowchart illustrating the logic used by the invention to implement this functionality is shown in FIG. 6.

Figure 6:
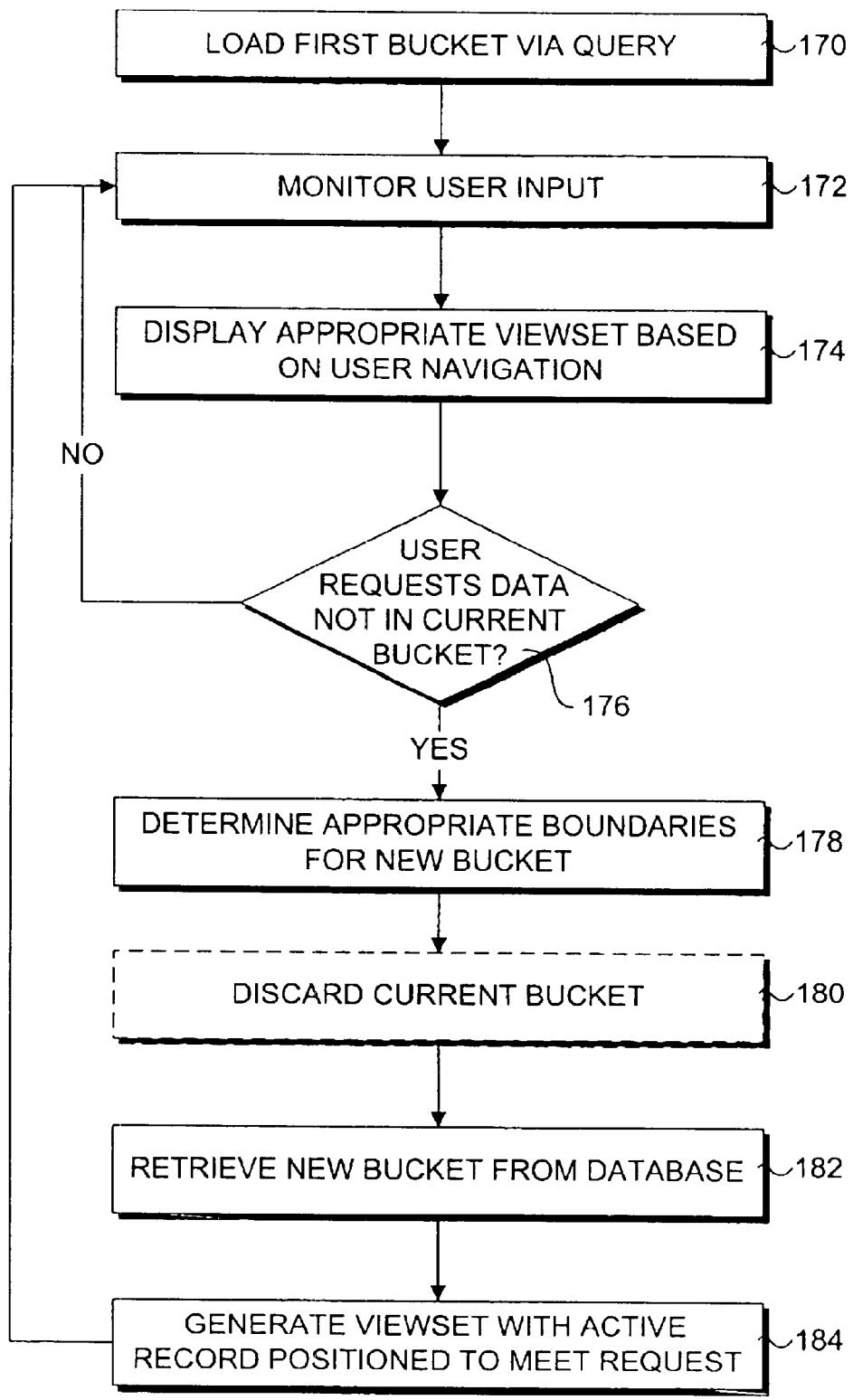
FIG. 6 is a flowchart illustrating the logic used by the invention in response to user navigation events.

Initially, a query will be performed to retrieve a first bucket of data based on a requested search, as provided by a block 170 in FIG. 6. When a typical data set is opened, the data returned includes a sorted set of all of the data matching the SQL query criteria, with record positioned at the beginning of the data set being marked as the active record. With LDV applied, the returned record set includes all of the data falling within the first bucket, positioned on the first record, and has knowledge that the record set is an "incomplete" set. As the bucket data is navigated (e.g., browsed or scrolled through using various user inputs), appropriate viewsets (i.e., subsets of the bucket that are displayed at any one time to the user) are presented to the user. As used herein, each user navigation input (e.g., page-up, page down, etc.) will generate a new navigation "context" for the user, and an appropriate new viewset will be provided to the user. These operations are depicted by blocks 172 and 174 in the flowchart. In effect, the viewset acts as a sliding window over the sorted records in the bucket. At the same time, the LDV classes monitor regular record set calls corresponding to navigation events such as MoveNext, MovePrevious and EOF, to determine if the user desires to view data that is not contained in the current bucket. If this condition is sensed, as indicated by a YES (TRUE) result to a decision block 176, appropriate boundaries for the new bucket are determined in a block 178. In one embodiment, the current bucket is discarded in a block 180. Optionally, the data corresponding to the current bucket may be maintained in a cache, such as a LRU (least recently used) cache. The choice of whether to discard buckets or use a cache will depend generally depend on the latency characteristics of the bucket retrievals.

Next, in a block 182, the new bucket of data is retrieved from the database, whereupon an appropriate viewset is sent to the client and the active record is positioned to meet the user's request. For example, if the user request data for "Frank Smith" the active record will correspond to the first "Frank Smith" encountered in the sorted list.

Sparsely Populated or Restricted Record Sets

Generally, the entire set is open when the GUI allows for an unfiltered list of data or when a batch process is going to operate on all of the data within a table. However, filters are often applied to the sorted columns of the query in order to return a targeted set of data. Analysis of the additional SQL and monitoring of the retrieved data sets allows the LDV helper class to alter the way it selects bucket boundaries to more optimally return data. For example, if a 'user' only requires people with a last name starting with "S", the helper processing immediately recognizes the additional restriction on the sort order columns and begins its bucket boundaries at the first boundary pair that includes that data. For example, the additional SQL (indicated in bold) for the first bucket might be:

```
SELECT*FROM CONTACTS
    WHERE LASTNAME LIKE 'S*'
    AND LASTNAME=>'S' AND
    LASTNAME<'Sampson'
    ORDER BY LASTNAME;
```

If the query is filtered on a column not covered by the LDV scheme or is part of an external table join, the pre-query processing to determine a bucket boundary cannot be made. However, through monitoring of the returned data sets, the LDV helper class can alter the number of buckets returned by one query. In the simplest form, this is accomplished by skipping a boundary definition and moving to the next one. For example, suppose a user selects everyone in New York City from a database that containes data on every person in the United States. This would result, assuming evenly distributed last names throughout the US, in about $\frac{1}{25}^{th}$ of the expected rows per bucket, since approximaty one in every twenty-five Americans live in New York City. In an attempt to retrieve the preset optimal count per bucket, the helper class would monitor the number of records returned in response to an initial or prior query, and internally increase the number of skipped boundaries in subsequent queries to retrieve new buckets of data as scrolling continues until the general returned amount is close to a desired bucket size. In this example, the helper might observer that the number of records retrived via a first query resulted in only $\frac{1}{25}^{th}$ of the number of records in the desired bucket size, whereupon the helper may adjust subsequent queries to skip 25 boundaries per re-query. The end result of this extra processing reduces unnecessary trips to the database server during a scrolling operation. This added technology is known as Dynamic Bucketing.

Rapid Seek Mechanism

When displaying a list of records, there are two main functional needs that must be met: The ability to soft seek on a piece of data, and the ability to re-open the application properly positioned within the list. Although trivial with small amounts of data, these become very complex tasks when dealing with hundreds of millions of rows. LDV bucketing information allows these tasks to be accomplished in subsecond time frames.

Using the boundary data, a soft seek forward in the sorted list becomes a simple task. The LDV class finds the appropriate bucket that the search for piece of data will lie in, returns that bucket of data (typically a sub-second call), and positions the active record on the appropriate record using its regular seek process. All the overhead of opening, sorting and seeking through hundreds of millions of rows is avoided.

To restart an application on a certain record, a unique key is usually known—such as the client ID. To take advantage of the boundary data, the application stores the client ID (or other unique identifyier) for the last records that was active and simply needs to query a single row corresponding to the stored client ID to return to the record(very quick). The appropriate sort column data can then be extracted from the record, enabling an appropriate bucket containing the record to be identified, whereupon the record set corresponding to the bucket is retrieved and opened (typically a sub-second call), and the active record is positioned on the record corresponding to the stored client ID.

The present invention provides several advantages over conventional large data set access techniques. Most notably, data access latencies are greatly reduced, often enabling a user to literally scroll through millions of records without requiring the user to wait for data to be retrieved or screens to be updated. The LDV scheme easily scales from small data sets to very large data sets, and enables a large number of concurrent users to leverage its features, while causing minimal additional overhead for both the database server and application servers.

Exemplary Computer System for Practicing the Invention

Figure 7:
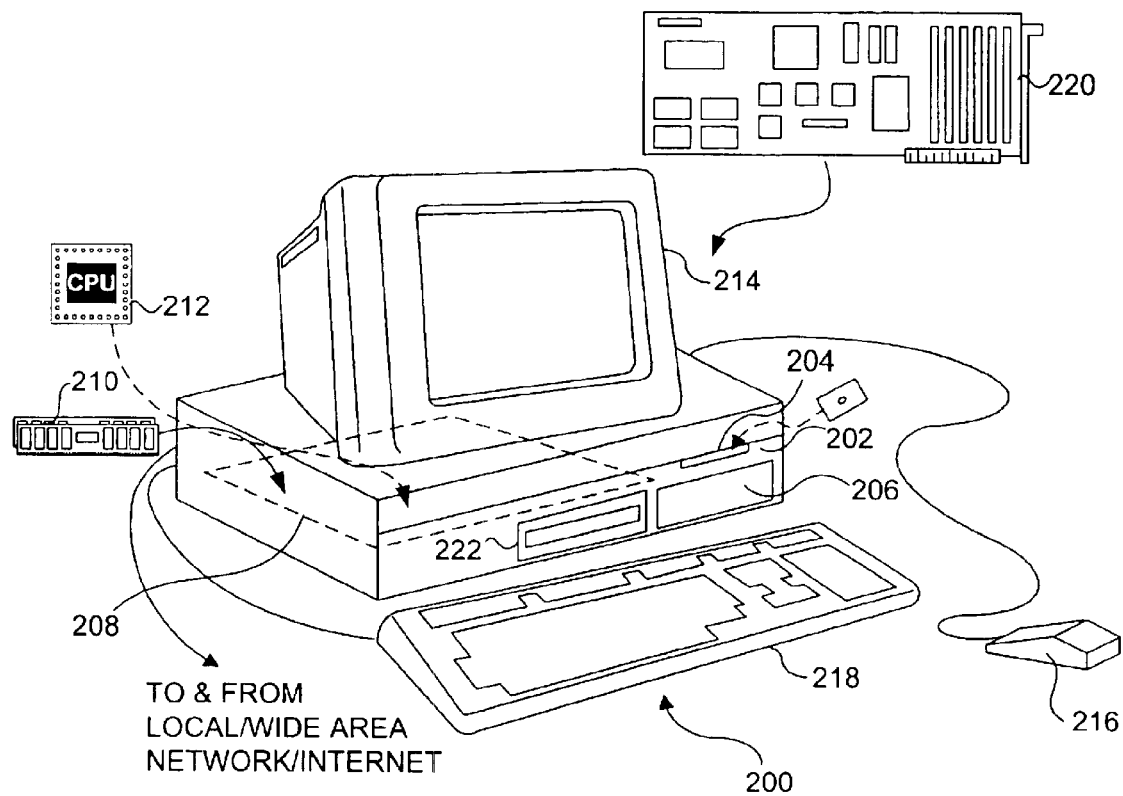
FIG. 7 is a schematic diagram of a computer system that may be used for the client machines and servers in the architectures of FIGS. 3 and 4.

With reference to FIG. 7, a generally conventional computer 200 is illustrated, which is suitable for use as client machines, application servers, and database servers in connection with practicing the present invention, and may be used for running client and server-side software comprising one or more software modules that implement the various operations of the invention discussed above. Examples of computers that may be suitable for client machines as discussed above include PC-class systems operating the Windows NT or Windows 2000 operating systems, Sun workstations operating the UNIX-based Solaris operating system, and various computer architectures that implement LINUX operating systems. Computer 200 is also intended to encompass various server architectures, as well as computers having multiple processors.

Computer 200 includes a processor chassis 202 in which are mounted a floppy disk drive 204, a hard drive 206, a motherboard 208 populated with appropriate integrated circuits including memory 210 and one or more processors (CPUs) 212, and a power supply (not shown), as are generally well known to those of ordinary skill in the art. It will be understood that hard drive 206 may comprise a single unit, or multiple hard drives, and may optionally reside outside of computer 200. A monitor 214 is included for displaying graphics and text generated by software programs and program modules that are run by the computer. A mouse 216 (or other pointing device) may be connected to a serial port (or to a bus port or USB port) on the rear of processor chassis 202, and signals from mouse 216 are conveyed to the motherboard to control a cursor on the display and to select text, menu options, and graphic components displayed on monitor 214 by software programs and modules executing on the computer. In addition, a keyboard 218 is coupled to the motherboard for user entry of text and commands that affect the running of software programs executing on the computer. Computer 200 also includes a network interface card 220 or built-in network adapter for connecting the computer to a computer network, such as a local area network, wide area network, or the Internet.

Computer 200 may also optionally include a compact disk-read only memory (CD-ROM) drive 222 into which a CD-ROM disk may be inserted so that executable files and data on the disk can be read for transfer into the memory and/or into storage on hard drive 206 of computer 200. Other mass memory storage devices such as an optical recorded medium or DVD drive may be included. The machine instructions comprising the software that causes the CPU to implement the functions of the present invention that have been discussed above will likely be distributed on floppy disks or CD-ROMs (or other memory media) and stored in the hard drive until loaded into random access memory (RAM) for execution by the CPU. Optionally, all or a portion of the machine instructions may be loaded via a computer network.

Although the present invention has been described in connection with a preferred form of practicing it and modifications thereto, those of ordinary skill in the art will understand that many other modifications can be made to the invention within the scope of the claims that follow. Accordingly, it is not intended that the scope of the invention in any way be limited by the above description, but instead be determined entirely by reference to the claims that follow.

What is claimed is:

1. A computer implemented method for accessing data records from a large set of records stored in a database, comprising:

Defining a plurality of boundaries to logically partition the large set of records into a plurality of buckets in accordance with a predefined sort order, said sort order based on data stored in at least two columns of a database table in which at least a base portion of each data record is stored;

in response to a request to retrieve a data record;

determining a bucket in which the data record is contained;

retrieving a subset of the large set of records from the database corresponding to data records contained in the bucket; and searching the plurality of boundaries for a sequentially-adjacent pair of boundaries as defined by the predetermined sort order that bound the data record in the request;

generating a query including a search clause defining a data set that is bounded by the sequentially-adjacent pair of boundaries; and executing the query against the database.

2. The method of claim 1, further comprising storing a boundary marker for each boundary comprising data pertaining to said at least two columns of the database table.

3. The method of claim 2, wherein each boundary marker comprises first, second and tertiary data values pertaining to data values stored in respective columns in the database table, said data values pertaining to an actual record or pseudo record to which that boundary marker corresponds.

4. The method of claim 2, wherein the boundary markers are stored as a concatenated list.

5. The method of claim 2, wherein the boundary markers are stored as a set of respective records in the database.

6. The method of claim 1, wherein the subset of data records corresponding to the bucket is provided to a batch processing component, further comprising retrieving other buckets of data and providing them to the batch processing component until data records corresponding to the entire large set of data records have been provided to the batch processing component.

7. The method of claim 1, further comprising:

monitoring user navigation events;

sending data corresponding to a current viewset to a client, said viewset comprising a subset of data records in the data bucket and corresponding to a current user navigation context; and in response to a user navigation event corresponding to a request to navigate to a new navigation context, updating the current viewset with a new viewset by sending a new subset of data records in the data bucket, wherein the new viewset corresponds to the new navigation context.

8. The method of claim 7, further comprising:

determining if a user navigation event corresponds to a request to view one or more data records that are not in a current data bucket;

and, in response to such a determination, formulating a query request corresponding to a new data bucket that contains the data records that are requested to be viewed;

executing the query to retrieve data records corresponding to the new data bucket from the database; and providing data corresponding to a new viewset comprising a subset of the data records in the new data bucket to the client.

9. The method of claim 7, wherein the client is a web browser and the data corresponding to the viewsets are sent as HTML data over a network to a client machine on which the web browser is running.

10. A machine-readable media on which a plurality of instructions are stored that when executed by a computing machine perform the operations of:

receiving a request to retrieve data records from a database on which a large set of records are stored;

searching a predefined set of boundaries that logically partition the large set of records into a plurality of buckets in accordance with a predefined sort order that is based on data stored in at least two columns of a database table in which at least a base portion of each data record is stored;

determining a bucket in which the data record is contained;

formulating a query to retrieve a subset of the large set of records, said subset corresponding to the data records contained in the bucket;

submitting the query to the database for execution;

receiving the subset of records contained in the bucket from the database;

searching the plurality of boundaries for a sequentially-adjacent pair of boundaries as defined by the predetermined sort order that bound the data record in the request; and formulating the query to include a search clause defining a data set that is bounded by the sequentially-adjacent pair of boundaries.

11. The machine-readable media of claim 10, wherein execution of the instructions further performs the operations of:

providing the subset of data records corresponding to the bucket to a batch processing component running on the computing machine or on another computing machine linked in communication with the machine;

iteratively formulating and submitting queries to the database to retrieve, other buckets of data and providing them to the batch processing component until data records corresponding to the entire large set of data records have been provided to the batch processing component.

12. The machine-readable media of claim 10, wherein execution of the instructions further performs the operations of:

monitoring user navigation events received from a client;

sending data corresponding to a current viewset to the client, said viewset comprising a subset of data records in the data bucket and corresponding to a current user navigation context; and in response to a user navigation event corresponding to a request to navigate to a new navigation context, updating the current viewset with a new viewset by sending a new subset of data records in the data bucket, wherein the new viewset corresponds to the new navigation context.

13. The machine-readable media of claim 12, wherein execution of the instructions further performs the operations of:

determining if a user navigation event corresponds to a request to view one or more data records that are not in a current data bucket;

and, in response to such a determination, formulating a query request corresponding to a new data bucket that contains the data records that are requested to be viewed;

executing the query to retrieve data records corresponding to the new data bucket from the database; and providing data corresponding to a new viewset comprising a subset of the data records in the new data bucket to the client.

14. The machine-readable media of claim 12, wherein the client is a web browser and the data corresponding to the viewsets are sent as HTML data over a network to a client machine on which the web browser is running.

15. The machine-readable media of claim 10, wherein execution of the instructions further performs the operations of:

monitoring a number of records returned by a query that is submitted to the database to retrieve the bucket of data records; and altering the query to dynamically adjust the size of subsequent buckets based on the number of records returned by a prior query relative to a number of records contained in a bucket having a desired size.

16. The machine-readable media of claim 15, wherein the size of the subsequent buckets are adjusted by skipping a determined number of boundaries.

17. A computer system comprising:

a memory in which a plurality of machine instructions are stored;

a network interface to link the computer in communication with a database server; and a processor, coupled to the memory and the network interface, to execute the plurality of machine instructions to cause the computer system to perform the operations of:

receiving a request to retrieve data records from a database hosted by the database server on which a large set of records are stored;

searching a predefined set of boundaries that logically partition the large set of records into a plurality of buckets in accordance with a predefined sort order that is based on data stored in at least two columns of a database table in which at least a base portion of each data record is stored;

determining a bucket in which the data record is contained;

formulating a query to retrieve a subset of the large set of records, said subset corresponding to the data records contained in the bucket;

submitting the query over the network interface to the database server for execution;

receiving the subset of records contained in the bucket from the database server;

searching the plurality of boundaries for a sequentially-adjacent pair of boundaries as defined by the predetermined sort order that bound the data record in the request; and formulating the query to include a search clause defining a data set that is bounded by the sequentially-adjacent pair of boundaries.

18. The computer system of claim 17, wherein execution of the machine instructions further performs the operations of:

providing the subset of data records corresponding to the bucket to a batch processing component running on the computing machine or on another computing machine linked in communication with the machine;

iteratively formulating and submitting queries to the database to retrieve, other buckets of data and providing them to the batch processing component until data records corresponding to the entire large set of data records have been provided to the batch processing component.

19. The computer system of claim 17, wherein the computer system is linked in communication with a client machine via the network interface and wherein execution of the machine instructions further performs the operations of:

monitoring user navigation events received from the client machine;

sending data corresponding to a current viewset to the client machine, said viewset comprising a subset of data records in the data bucket and corresponding to a current user navigation context; and in response to a user navigation event corresponding to a request to navigate to a new navigation context, updating the current viewset with a new viewset by sending a new subset of data records in the data bucket to the client machine, wherein the new viewset corresponds to the new navigation context.

20. The computer system of claim 19, wherein execution of the machine instructions further performs the operations of:

determining if a user navigation event corresponds to a request to view one or more data records that are not in a current data bucket;

and, in response to such a determination, formulating a query request corresponding to a new data bucket that contains the data records that are requested to be viewed;

submitting the query request to the database server;

receiving corresponding to the new data bucket from the database server in response to the query request; and providing data corresponding to a new viewset comprising a subset of the data records in the new data bucket to the client machine.

21. The computer system of claim 19, wherein a web browser is running on the client machine and the data corresponding to the viewsets are sent as HTML data via the network interface to the client machine.

22. The computer system of claim 17, wherein execution of the machine instructions further performs the operations of:

monitoring a number of records returned by a query that is submitted to the database server to retrieve the bucket of data records; and altering the query to dynamically adjust the size of subsequent buckets based on the number of records returned by a prior query relative to a number of records contained in a bucket having a desired size.

23. The computer system of claim 22, wherein the size of the subsequent buckets are adjusted by skipping a determined number of boundaries.

* * * * *